(12) United States Patent
Bent et al.

(10) Patent No.: US 10,496,421 B1
(45) Date of Patent: Dec. 3, 2019

(54) SIMULATION OF ASYNCHRONOUS MODIFICATIONS OF SHARED DATA OBJECTS BY A DISTRIBUTED APPLICATION

(71) Applicant: EMC IP Holding Company LLC, Hopkinton, MA (US)

(72) Inventors: John M. Bent, Los Alamos, NM (US); Sorin Faibish, Newton, MA (US); Jingwang Zhang, Beijing (CN); Haiyun Bao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 403 days.

(21) Appl. No.: 14/869,036

(22) Filed: Sep. 29, 2015

(51) Int. Cl.
*G06F 9/455* (2018.01)
*G06F 11/14* (2006.01)

(52) U.S. Cl.
CPC .......... *G06F 9/455* (2013.01); *G06F 11/1438* (2013.01); *G06F 2201/82* (2013.01)

(58) Field of Classification Search
CPC ... G06F 11/1438; G06F 2201/82; G06F 9/455
See application file for complete search history.

(56) References Cited

U.S. PATENT DOCUMENTS 6,332,200 B1 * 12/2001 Meth .................... G06F 11/1458
707/999.202
7,013,465 B1 * 3/2006 Taylor ...................... G06F 9/546
719/313

(Continued)

OTHER PUBLICATIONS

Shahzad, F. et al. "An Evaluation of Different I/O Techniques for Checkpoint/Restart." 2013 IEEE 27th International Symposium on Parallel & Distributed Processing Workshops and PhD Forum (2013), doi: 10.1109/IPDPSW.2013.145 [retrieved on Oct. 22, 2017]. Retrieved from <http://ieeexplore.ieee.org/abstract/document/6651069/>.*

(Continued)

*Primary Examiner* — Rehana Perveen
*Assistant Examiner* — Alfred H B Wechselberger
(74) *Attorney, Agent, or Firm* — Ryan, Mason & Lewis, LLP (57) ABSTRACT

Methods and apparatus are provided for simulating asynchronous modifications of shared data objects by a number of distributed processes within a distributed application. An exemplary method comprises obtaining a plurality of simulation parameters that define parameters of a simulated distributed application, parameters of a plurality of distributed compute nodes on which the simulated distributed application executes and a storage system employed by the simulated distributed application; and applying the plurality of simulation parameters to a simulation engine, wherein the simulation engine simulates both synchronous and asynchronous modifications of at least one shared data object by a plurality of distributed processes within the simulated distributed application. One or more exemplary techniques evaluate a degree to which an asynchronous shared data modification model can improve overall performance of a distributed application or reduce the required capabilities of the storage system needed to support the distributed application, relative to the same distributed application using a synchronous shared data modification model.

20 Claims, 8 Drawing Sheets

(56) References Cited

U.S. PATENT DOCUMENTS

| | | | | |
|---|---|---|---|---|
| 8,095,826 B1* | 1/2012 | Deolasee | G06F 11/1471 | |
| | | | 714/15 | |
| 8,826,070 B1* | 9/2014 | Havemose | G06F 11/1461 | |
| | | | 714/13 | |
| 8,826,273 B1* | 9/2014 | Chen | G06F 9/45558 | |
| | | | 718/1 | |
| 2006/0085679 A1* | 4/2006 | Neary | G06F 11/1482 | |
| | | | 714/13 | |
| 2006/0089951 A1* | 4/2006 | Factor | G06F 11/3485 | |
| 2011/0047334 A1* | 2/2011 | Eichenberger | G06F 11/1405 | |
| | | | 711/141 | |
| 2011/0119525 A1* | 5/2011 | Muralimanohar | G06F 11/1438 | |
| | | | 714/15 | |
| 2012/0011401 A1* | 1/2012 | Ranganathan | G06F 11/1484 | |
| | | | 714/19 | |
| 2016/0034362 A1* | 2/2016 | Al-Wahabi | G06F 11/203 | |
| | | | 714/4.1 | |

OTHER PUBLICATIONS

Naksinehaboon, N. et al. "High Performance Computing Systems with Various Checkpointing Schemes." International Journal of Computer, Communications & Control, vol. IV (2009), No. 4, pp. 386-400, ISSN 1841-9836 [retrieved on Oct. 22, 2017]. Retrieved from <https://www.researchgate.net/profile/Mihaela_Paun/publication/269985877_High_Performance_Comput>.*

Bosilca, G. et al. "Unified Model for Assessing Checkpointing Protocols at Extreme-Scale." Research Report No. 7950 (May 2012) [retrieved on Oct. 22, 2017]. Retrieved from <http://onlinelibrary.wiley.com/doi/10.1002/cpe.3173/full>.*

Levy. S. et al. "Using Simulation to Evaluate the Performance of Resilience Strategies at Scale." Concurrency and Computation Practice and Experience, vol. 26, No. 17 (2014), doi: 10.1002/cpe.3173 [retrieved on Oct. 22, 2017]. Retrieved from <https://link.springer.com/chapter/10.1007/978-3-319-10214-6_5>.*

Riesen et al. "Alleviating Scalability Issues of Checkpointing Protocols." SC '12: Proceedings of the International Conference on High Performance Computing, Networking, Storage and Analysis (2012), doi: 10.1109/SC.2012.18 [retrieved on Oct. 22, 2017]. Retrieved from <http://ieeexplore.ieee.org/abstract/document/6468460/>.*

Laadan et al. "Transparent Checkpoint-Restart of Distributed Applications on Commodity Clusters." Proceedings of the 2005 IEEE International Conference on Cluster Computing (Cluster 2005), Boston, MA (2005) [retrieved on Oct. 19, 2017]. Retrieved from <http://www.cs.columbia.edu/~orenl/papers/cluster05-checkpoint.pdf>.*

"transaction". Merriam-Webster.com [retrieved on May 21, 2018]. Retrieved from <https://www.merriam-webster.com/dictionary/transaction>.*

"transacting". Merriam-Webster.com [retrieved on May 21, 2018]. Retrieved from <https://www.merriam-webster.com/dictionary/transacting>.*

Bouteiller et al. "Correlated Set Coordination in Fault Tolerant Message Logging Protocols" Euro-Par 2011, pp. 51-64 [retrieved on Mar. 2, 2019]. Retrieved from <http://www.netlib.org/utk/people/JackDongarra/journals/2011_Correlated-Set-Coordination-in-Fault-Tolerant-Message-Logging-Protocols.pdf> (Year: 2011).*

Gao et al. "Group-based Coordinated Checkpointing for MPI: A Case Study on InfiniBand" 2007 International Conference on Parallel Processing [retrieved on Mar. 2, 2019]. Retrieved from <https://ieeexplore.ieee.org/document/4343854/> (Year: 2007).*

Wikipedia (Atomic Commit), Wikipedia Commons [retrieved on Mar. 2, 2019]. Retrieved from <https://en.wikipedia.org/wiki/Atomic_commit> (Year: 2019).*

El-Sayed et al. "A Distributed Counter-based Non-blocking Coordinated Checkpoint Algorithm for Grid Computing Applications" 2012 2nd Inter Conf on Advances in Comp Tools for Eng Apps [retrieved on Feb. 22, 2019]. Retrieved from <http://ieeexplore.ieee.org/document/6462909/> (Year: 2012).*

Kathuria et al. "Transaction Isolation and Lazy Commit" 2007 IEEE 23rd International Conference on Data Engineering; doi: 10.1109/ICDE.2007.368979 [retrieved on Jun. 30, 2019]. Retrieved from <http://ieeexplore.ieee.org/abstract/document/4221769/>(Year: 2007).*

Elnozahy et al. "A Survey of Rollback-Recovery Protocols in Message-Passing Systems" ACM Computing Surveys, vol. 34, No. 3, Sep. 2002, pp. 375-408 [retrieved on Jul. 1, 2019]. Retrieved from <https://dl.acm.org/citation.cfm?id=568525> (Year: 2002).*

Bhargava et al., "Independent Checkpointing and Concurrent Rollback for Recovery in Distributed Systems—an Optimistic Approach," Proc. Seventh Symposium on Reliable Distributed Systems, (Oct. 3-12, 1988).

Riesen et al., "Alleviating Scalability Issues of Checkpointing Protocols," Proc. of Int'l Conf. on High Performance Computing, Networking, Storage and Analysis, 18:1-18:11 (2012).

U.S. Appl. No. 13/931,940, filed Jun. 30, 2013, entitled "Asynchronous Checkpointing With Message Passing to Burst Buffers".

U.S. Appl. No. 14/041,855, filed Sep. 30, 2013, entitled "Asynchronous Writing and Incremental Checkpointing".

U.S. Appl. No. 14/319,647, filed Jun. 30, 2014, entitled "End-to-End Data Integrity in Parallel Storage Systems".

U.S. Appl. No. 14/230,829, filed Mar. 31, 2014, entitled "Advanced Metadata Management".

U.S. Appl. No. 14/580,529, filed Dec. 23, 2014, entitled "Mulit-Tier Data Storage Using Inclusive/Exclusive Burst Buffer Caching Based on Reference Counts".

* cited by examiner

```
                                            ┌─400
for ckpt in range (0, max_ckpts):
  for ts in range (0, max_timesteps):
    compute();
    exchange(exchange_group);
  if mode == SYNCH      # Sync Mod Mode ──410
    barrier();          # barrier
    open("ckpt.%d" % ckpt);
    write(data);
    close();
  else:                 # Async Mod Mode ──420
    # no barrier
    bad_trans_start(tid=ckpt,
              participants=sizeof(exchange_group));
    bad_trans_write(data);
    bad_trans_finish();
```

*FIG. 5*

| PARAMETER | DESCRIPTION | DEFAULT |
|---|---|---|
| COMPUTE TIME | THE SIMULATED AMOUNT OF COMPUTE TIME WITHIN EACH TIMESTEP | 6 SECONDS |
| COMPUTE VARIANCE | THE MAXIMUM RANDOMIZED DIFFERENCE BETWEEN COMPUTE TIMESTEPS | 16.7% |
| TIMESTEPS PER CKPT | THE SIMULATED NUMBER OF TIMESTEPS BETWEEN CHECKPOINTS | 45 |
| CHECKPOINT TIME | THE SIMULATED CHECKPOINT LATENCY | 30 SECONDS |
| CHECKPOINT VARIANCE | THE MAXIMUM RANDOMIZED DIFFERENCE BETWEEN CHECKPOINTS | 0% |
| RUNTIME | THE TOTAL SIMULATED RUNTIME | 300 CHECKPOINTS |
| JOB SIZE | THE NUMBER OF PROCESSES IN THE SIMULATED 2D COMPUTE GRID | $1024^2$ |
| HOTSPOT MOVEMENT | THE SPEED OF HOTSPOT MOVEMENT WITHIN THE 2D COMPUTE GRID | 1:1 |
| COMM SIZE | THE SIZE OF PEER GROUPS EXCHANGING DATA BETWEEN TIMESTEPS | NEIGHBORS |

810
```
USE_MPI = True              # False indicates that IOD is used
CALCULATE_SIGMA = 1         # sigma of calculation time per node:
                            # 0 (no variation), 0.125, 0.25, 0.5, 1 (default), 2, 3, 4 and 5 for example
SHIFT_WORKLOAD = 3          # 0: rerandom load every step. n: shift the same random workload every n steps
                            # if 0 < n < 1 then shift 1/n lines per step
                            # 0.125, 0.25, 0.5, 1, 2, 3 (default), 4, 8 and 16 for example
NEIGHBOR_DEPTH = 1          # The distance to the farthest neighbor. 1 for 8-neighboring, 2 for 24-neighboring, and so on
                            # -1 (all), 0 (none), 1 (default), 2, 3, 4 and 5 for example.
OUTPUT_CSV = True           # Output in comma-separated-value format, so that it can be processed by Excel easily
SHOW_GRID = False           # Show the progress in grid, so that Excel can show it
RANDOM_SEED = 2             # 0: don't set random seed
NPROCX = 1024               # number of nodes per col
NPROCY = 1024               # number of nodes per row
CALCULATE_MU = 6            # mean time of calculation per node. 6 for default.
CHECKPOINT_MU = 30          # mean time of checkpoint per node. 30 for default.
CHECKPOINT_SIGMA = 6        # sigma of checkpoint per node. 6 for default.
CHECKPOINT_FRQ = 45         # steps per checkpoint (cycle). 45 for default.
NCHECKPOINTS = 300          # number of checkpoints. 300 for default.
row = numpy.zeros((1, NPROCY))
col = numpy.zeros((NPROCX, 1))
```

820
```
class AllRanks:
    def generate_random(self, mean, sigma, lines):
        if sigma == 0:
            return numpy.ones((lines, NPROCY)) * mean
        else:
            return numpy.random.normal(mean, sigma, (lines, NPROCY))
```

FIG. 8B

```
def __init__(self):
    if RANDOM_SEED != 0:
        numpy.random.seed(RANDOM_SEED)
    self.timestep = numpy.zeros((NPROCX, NPROCY))
    self.new_timestep = numpy.zeros((NPROCX, NPROCY))
    self.step = 0
    if SHIFT_WORKLOAD != 0:
        self.workload = self.generate_random(CALCULATE_MU,
            CALCULATE_SIGMA, NPROCX)
```
— 830

```
def shift_workload(self, lines):
    new_lines = self.generate_random(CALCULATE_MU, CALCULATE_SIGMA, lines)
    self.workload = numpy.vstack((self.workload[lines:,:], new_lines))
```
— 840

```
def calculate(self):
    if SHIFT_WORKLOAD != 0:
        self.timestep += self.workload
        # roll one row up per SHIFT_WORKLOAD steps
        if SHIFT_WORKLOAD < 1:
            self.shift_workload(int(1/SHIFT_WORKLOAD))
        elif self.step % SHIFT_WORKLOAD == SHIFT_WORKLOAD - 1:
            self.shift_workload(1)
    else:
        self.timestep += self.generate_random(CALCULATE_MU,
            CALCULATE_SIGMA, NPROCX)
```
— 850

```
def wait_dependency_depth(self):
    shift = numpy.array(self.timestep)
    new_timestep = numpy.array(self.timestep)
    for i in range(NEIGHBOR_DEPTH):
        shift = numpy.vstack((shift[1:,:], row))
        new_timestep = numpy.where(numpy.greater(new_timestep, shift),
            new_timestep, shift)
    shift = numpy.array(self.timestep)
    for i in range(NEIGHBOR_DEPTH):
        shift = numpy.vstack((row, shift[:NPROCX-1, :]))
        new_timestep = numpy.where(numpy.greater(new_timestep, shift),
            new_timestep, shift)
    shift = numpy.array(new_timestep)
    self.timestep = numpy.array(new_timestep)
    for i in range(NEIGHBOR_DEPTH):
        shift = numpy.hstack((shift[:,1:], col))
        self.timestep = numpy.where(numpy.greater(self.timestep, shift),
            self.timestep, shift)
    shift = numpy.array(new_timestep)
    for i in range(NEIGHBOR_DEPTH):
        shift = numpy.hstack((col, shift[:,:NPROCY-1]))
        self.timestep = numpy.where(numpy.greater(self.timestep, shift),
            self.timestep, shift)
```
— 860

```
870 ─┤  def wait_dependency_all(self):
         self.barrier()

def receive_data(self):
            if (NEIGHBOR_DEPTH == -1):
                self.wait_dependency_all()
            else:
                self.wait_dependency_depth()
            self.step += 1
880 ─┤      if self.step % CHECKPOINT_FRQ == 0:
                if USE_MPI:
                    self.barrier()
                self.output()
                self.checkpoint()
                if USE_MPI:
                    self.barrier()

def output(self):
            mint = self.timestep.min()
            maxt = self.timestep.max()
            if (OUTPUT_CSV):
                if (not USE_MPI):
                    print("%.2f, +%.2f" % (mint, maxt - mint))
                else:
                    print("%.2f" % mint)
890 ─┤      if (SHOW_GRID):
                for x in range(self.procX):
                    for y in range(self.procY):
                        print(",%.2f" % (self.timestep[x][y] - mint), end= "")
                    print(end="\n")
            else:
                print(self.step, " checkpoint starts at
                (min:%.2f, max:%.2f)" % (mint, maxt))
            sys.stdout.flush()

894 ─┤  def barrier(self):
            max_lat = self.timestep.max()
            self.timestep = numpy.ones ((NPROCX, NPROCY)) * max_lat 898 ─┤  def checkpoint(self):
            self.timestep += self.generate_random
            (CHECKPOINT_MU, CHECKPOINT_SIGMA, NPROCX)

allranks = AllRanks()
    for i in range(NCHECKPOINTS * CHECKPOINT_FRQ):
        allranks.calculate()
        allranks.receive_data()
```

SIMULATION OF ASYNCHRONOUS MODIFICATIONS OF SHARED DATA OBJECTS BY A DISTRIBUTED APPLICATION

FIELD

The invention relates generally to data storage, and more particularly to techniques for simulating asynchronous modifications of shared data objects by a number of distributed processes within a distributed application.

BACKGROUND

Parallel storage systems provide high degrees of concurrency in which many distributed processes within a distributed application simultaneously access a shared file namespace. Parallel computing techniques are used in many industries and applications for implementing computationally intensive models or simulations. Due to their tightly coupled nature, many of these distributed applications perform bulk synchronous input/output (IO) operations in which they alternate between compute phases and state capture phases. Typically, the state capture phase comprises bulk synchronous state storage in which all processes call a barrier operation (i.e., a fence) and perform their state storage synchronously. In this manner, there are no outstanding messages being processed during the state capture phase that might cause inconsistencies in the distributed state capture.

Unfortunately, the synchronous nature of the distributed state capture creates several problems. For example, the storage system must support the full bandwidth of all of the distributed processes for short bursts of time and is otherwise idle. In addition, the computational resources on which the distributed processes execute will be unnecessarily idle when fast processes wait at the barrier for slower processes. Thus, the bulk synchronous IO model for distributed state capture causes inefficient use of both compute servers and storage servers.

A number of techniques have been proposed to reduce the overall application runtime and lessen the peak bandwidth requirement of the storage system by using asynchronous checkpoint techniques. Message logging-based asynchronous checkpoint techniques require the logging of all messages since the checkpoints do not correspond to a synchronous moment in the state of the distributed data structure. The complete state is reconstructed from the asynchronous checkpoints and the logged messages. Transaction-based asynchronous checkpoint systems employ coordination within the distributed storage system to ensure a consistent checkpoint data set.

Due to the high costs of conversion, however, customers are reluctant to transform existing distributed applications to employ asynchronous modifications of shared data objects by the various processes within the distributed application. A need therefore exists for methods and apparatus for simulating asynchronous modifications of shared data objects by a number of distributed processes within a distributed application, in order to evaluate the benefits of such a conversion. A further need exists for techniques for identifying and quantifying a degree to which various asynchronous program characteristics improve overall performance of the distributed application or reduce the required capabilities of the storage system.

SUMMARY

Illustrative embodiments of the present invention provide methods and apparatus for simulating asynchronous modifications of shared data objects by a number of distributed processes within a distributed application. In one exemplary embodiment, a method comprises the steps of obtaining a plurality of simulation parameters that define parameters of a simulated distributed application, parameters of a plurality of distributed compute nodes on which the simulated distributed application executes and a storage system employed by the simulated distributed application; and applying the plurality of simulation parameters to a simulation engine, wherein the simulation engine simulates both synchronous and asynchronous modifications of at least one shared data object by a plurality of distributed processes within the simulated distributed application.

In one or more exemplary embodiments, the simulation engine selectively enables one or more barrier operations associated with synchronous modifications of the at least one shared data object by the plurality of distributed processes and selectively disables one or more barrier operations associated with the asynchronous modifications of the at least one shared data object by the plurality of distributed processes.

In at least one embodiment, a throughput performance of the simulated distributed application is assessed in an asynchronous modification mode that performs the asynchronous modifications of the at least one shared data object. One or more parameter values of the simulated distributed application are optionally varied for a plurality of successive distributed state capture operations by the simulated distributed application. For example, an exemplary embodiment allows a compute variation parameter, a communication size parameter, a hotspot movement parameter, a runtime parameter and/or a job size parameter to be varied. The exemplary simulator in at least one embodiment can evaluate the required capabilities of the storage system in the asynchronous modification mode to achieve a substantially similar performance as the simulated distributed process in a synchronous modification mode.

As noted above, illustrative embodiments described herein provide significant improvements relative to conventional synchronous modifications of shared data objects for distributed applications and permit quantifying a degree to which an asynchronous shared data modification model can improve overall performance of the distributed application or reduce the required capabilities of the storage system needed to support the distributed application.

BRIEF DESCRIPTION OF THE DRAWINGS

FIGS. 8A through 8C, collectively, illustrate exemplary pseudo code for a performance comparison simulator in accordance with an embodiment of the invention.

DETAILED DESCRIPTION

Illustrative embodiments of the present invention will be described herein with reference to the storage of data generated by an exemplary parallel computing system and associated clients, servers, storage arrays and other processing and storage devices. It is to be appreciated, however, that the invention is not restricted to use with the particular illustrative parallel computing system and device configurations shown. Accordingly, the terms "parallel computing system" and "parallel file system," as used herein, are intended to be broadly construed so as to encompass, for example, distributed computing systems and other types of computing systems and related storage implemented using one or more processing and storage devices. While aspects of the invention are illustrated in the context of exemplary asynchronous checkpoints, the present invention can be employed to simulate other asynchronous modifications of shared data objects by a number of distributed processes within a distributed application, as would be apparent to a person of ordinary skill in the art.

In one exemplary embodiment, methods and apparatus are provided for simulating asynchronous modifications of shared data objects by a number of distributed processes within a distributed application, referred to herein as an asynchronous modification mode. In addition, methods and apparatus are provided for simulating synchronous modifications of shared data objects by a number of distributed processes within a distributed application, referred to herein as a synchronous modification mode. Aspects of the invention evaluate a degree to which an asynchronous shared data modification model can improve overall performance of the distributed application or reduce the required capabilities of the storage system needed to support the distributed application, relative to the same distributed application using a synchronous shared data modification model.

As noted above, checkpoint-restart has become a dominant method for providing fault tolerance for parallel applications. Scientific simulations have traditionally relied on a coordinated checkpoint construction and bulk synchronous processing (BSP) in which all of the application processes call a barrier operation (or fence), and synchronously capture their state into one or more files. The large memory footprint required by these simulations makes it unrealistic for the computation to continue while the checkpoint data is being written.

In addition, evolving bulk asynchronous processing (BAP) IO techniques, such as BAD checkpointing techniques, allow a distributed application to reduce the overall application runtime and lessen the peak bandwidth requirement of the storage system. For example, a number of IO mechanisms have been proposed that enable uncoordinated checkpointing. See, for example, B. Bhargava and S.-R. Lian, "Independent Checkpointing and Concurrent Rollback for Recovery in Distributed Systems—an Optimistic Approach," Proc. Seventh Symposium on Reliable Distributed Systems, 3-12 (October 1988), or R. Riesen et al., "Alleviating Scalability Issues of Checkpointing Protocols," Proc. of Int'l Conf. on High Performance Computing, Networking, Storage and Analysis, 18:1-18:11 (2012), each incorporated by reference herein.

In addition, a number of patent applications have been filed that disclose asynchronous modifications of shared data objects by a number of distributed processes within a distributed application, such as asynchronous checkpointing techniques. See, for example, U.S. patent application Ser. No. 13/931,940, filed Jun. 30, 2013, entitled "Asynchronous Checkpointing With Message Passing to Burst Buffers;" U.S. patent application Ser. No. 14/041,855, filed Sep. 30, 2013, entitled "Asynchronous Writing and Incremental Checkpointing;" U.S. patent application Ser. No. 14/319,647, filed Jun. 30, 2014, entitled "End-to-End Data Integrity in Parallel Storage Systems;" U.S. patent application Ser. No. 14/230,829, filed Mar. 31, 2014, entitled "Advanced Metadata Management;" and/or U.S. patent application Ser. No. 14/580,529, filed Dec. 23, 2014, entitled "Multi-Tier Data Storage Using Inclusive/Exclusive Burst Buffer Caching Based on Reference Counts," each incorporated by reference herein.

One or more embodiments of the invention simulate an existing distributed application in an asynchronous modification mode by describing the IO behavior of the distributed application. For example, characteristics of an existing workload can be applied to the disclosed simulator to obtain a performance comparison for the existing distributed application employing a synchronous modification mode and an asynchronous modification mode. In addition, one or more parameters of the asynchronous modification mode can be varied to assess the performance in an asynchronous IO model with different parameters, as discussed further below.

It has been found that bulk asynchronous distributed state capture is beneficial, for example, when one or more of the following criteria are met by the distributed application:

i. computational variation between successive distributed state captures—this variation can be due to "hot spots" (i.e., when given processes have more work to do than other processes in the distributed application for a given time period) in the distributed state computation or architectural jitter of the system causing single instruction, multiple data (SIMD) execution to proceed at different rates on different compute servers;

ii. computational variation moving from one process to another between successive distributed state captures—if the same process is always the slow process, there will not be significant global speedup; and iii. message exchange within the application is not globally synchronous—if the application does periodic broadcast messages, for example, then there will be no asynchrony in the application and thus asynchronous distributed state capture will not provide a significant benefit.

For example, in at least one embodiment, the disclosed simulation techniques can be employed to assess a throughput performance of an existing distributed application in an asynchronous modification mode. The simulation may show that the benefit of conversion to an asynchronous modification model is minimal due to the use of global communication routines. With further exploration, the simulation might show a larger benefit if the distributed application dispensed with global communications. It may be determined for a given application that the global communications are not strictly necessary and were used as a convenience since the code was synchronous anyway. In this manner, the simulation may show, for example, that the global communications can be removed and the IO routines can be rewritten to achieve a faster runtime.

In another use case, a customer is building a new compute system with an attached storage system. The compute system must be 90% efficient and therefore only spend 10% of its time writing IO. With a synchronous distributed state capture, the storage system must have high performance and will be expensive (likely 40% of a total budget). The disclosed simulation techniques can show, for example, that switching to an asynchronous distributed state capture will reduce the required bandwidth and require a less capable storage system thereby reducing the cost of the storage system to, for example, only 25% of the total budget.

Figure 1A:
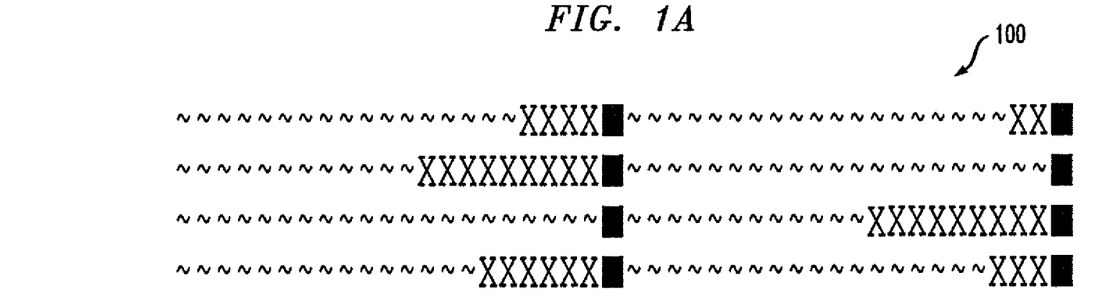
FIG. 1A illustrates an exemplary distributed application that employs a synchronous IO model.
Figure 1B:
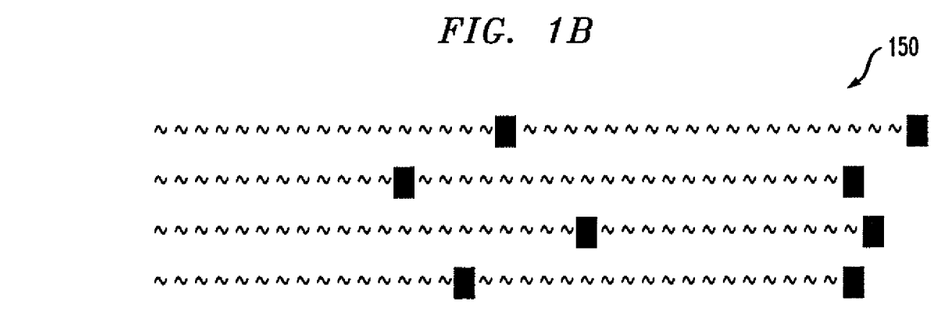
FIG. 1B illustrates an exemplary distributed application that employs an asynchronous IO model.

FIG. 1A illustrates an exemplary distributed application 100 that employs a synchronous IO model and FIG. 1B illustrates an exemplary distributed application 150 that employs an asynchronous IO model. Each process within the respective distributed application 100, 150 is represented with a single row in FIGS. 1A and 1B, computation is represented with a '~' symbol, idleness is represented with an 'X' symbol, and IO is represented with a filled-in box symbol "■."

As shown in FIG. 1A, the distributed application 100 alternates between computational phases where simulation progress is achieved, and checkpoint phases which serve to protect against hardware and software failures. Between compute and checkpoint phases, occasional periods of idleness are necessary as the synchronous IO model forces faster processes to wait for slower processes.

Beyond the lack of simulation progress by the distributed application 100 during checkpoint phases, bulk synchronous checkpoint techniques also affect how storage systems are designed and built. In order to reduce the time spent writing checkpoint data, system architects often design storage systems that can satisfy extremely bursty I/O bandwidth requirements. That is, the storage system must be designed to provide extremely high ingest bandwidth that is always available for use, even though the available peak bandwidth will be used infrequently. Thus, even if the storage system is accessed by the entire data center, checkpoints must be serviced immediately; otherwise, the compute nodes, usually the most expensive resource within the data center, will be idle which results in lost scientific productivity.

The distributed application 150 that employs an asynchronous IO model, as shown in FIG. 1B, has the potential to both reduce overall application runtime and lessen the peak bandwidth requirement of the storage system, as noted above. For improved benefit, as discussed further below, asynchronous checkpointing should support prior state dependencies and also should not create additional copies of large data sets. The disclosed simulation techniques can identify the application requirements that enable the asynchronous IO model and quantify the degree to which these requirements must be present in order to benefit from the asynchronous IO model.

Figure 2:
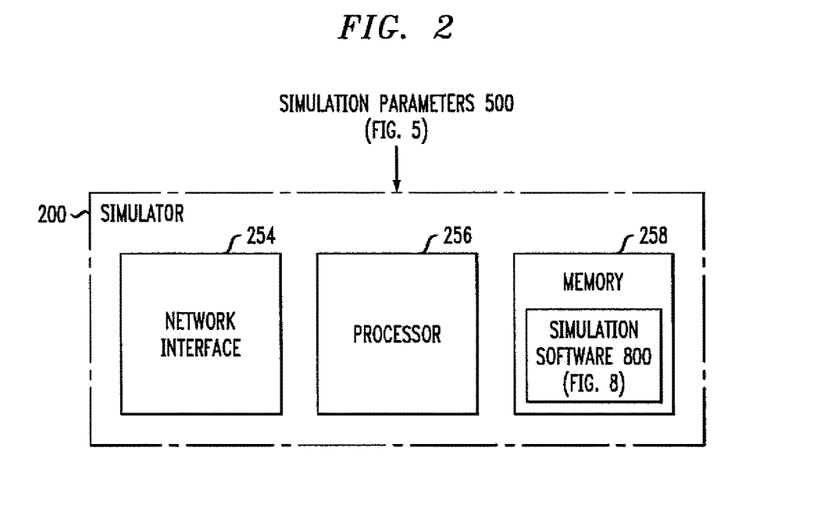
FIG. 2 illustrates a simulator in accordance with one embodiment of the invention.
Figure 5:
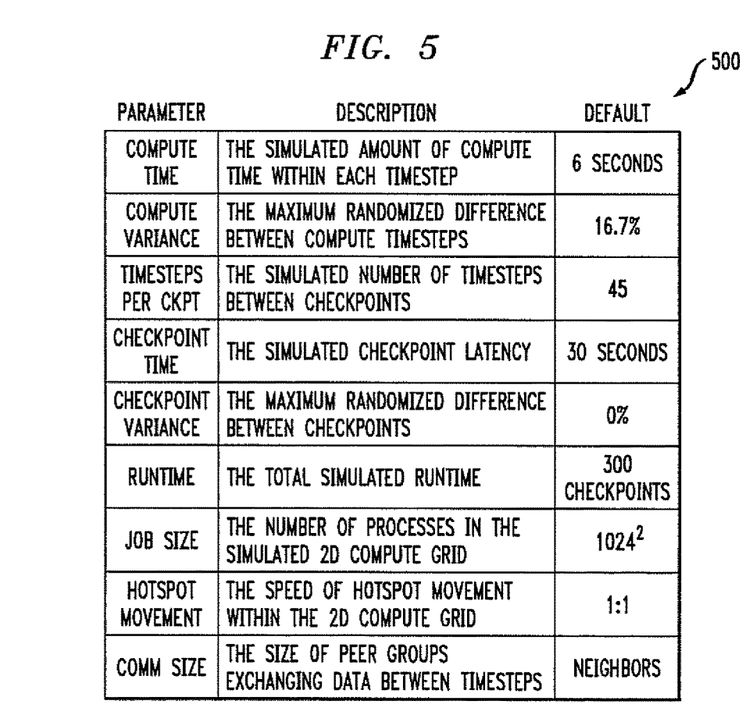
FIG. 5 illustrates an exemplary set of simulation parameters that may be employed to configure the simulator of FIG. 2 for a particular distributed application under consideration.

FIG. 2 illustrates a simulator 200 in accordance with one embodiment of the invention. As shown in FIG. 2, simulation parameters 500, discussed further below in conjunction with FIG. 5, are applied to the simulator 200. Generally, the exemplary simulation parameters 500 define parameters of the simulated distributed application as well as aspects of the compute nodes and storage system on which the distributed application executes.

The exemplary simulator 200 may be implemented, for example, using the SimPy simulation engine based on the Python programming language. As shown in FIG. 2, the exemplary simulator 200 comprises a processor 256 coupled to a memory 258. The memory 258 stores simulation software 800, discussed further below in conjunction with FIG. 8. The exemplary simulator 200 executes the simulation software 800 based on the applied simulation parameters 500 to simulate execution of the distributed application in a synchronous modification mode and/or an asynchronous modification mode. As discussed further below in conjunction with FIG. 8, the exemplary simulation software 800 simulates how the distributed application would behave using asynchronous modifications of shared data objects by a number of distributed processes within the distributed application.

The processor 256 may comprise a microprocessor, a microcontroller, an application-specific integrated circuit (ASIC), a field-programmable gate array (FPGA) or other type of processing circuitry, as well as portions or combinations of such circuitry elements. The memory 258 may comprise random access memory (RAM), read-only memory (ROM) or other types of memory, in any combination.

The memory 258 and other memories disclosed herein may be viewed as examples of what are more generally referred to as "computer program products" storing executable computer program code. Also included in the exemplary simulator 200 is network interface circuitry 254. The network interface circuitry 254 allows the simulator 200 to communicate over a network (not shown) with other devices. The network interface circuitry 254 may comprise, for example, one or more conventional transceivers.

The simulator 200 may be implemented at least in part in the form of software that is stored in memory 258 and executed by processor 256. The simulator 200 comprising processor, memory and network interface components as described above is an example of what is more generally referred to herein as a "processing device." The network (not shown) may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks. The term "network" as used herein is therefore intended to be broadly construed, so as to encompass a wide variety of different network arrangements, including combinations of multiple networks possibly of different types.

The simulated application may employ a parallel file system. The parallel file system may be implemented, by way of example, in the form of a cluster file system, such as a Lustre file system, although use of Lustre is not a requirement of the present invention. Additional details regarding conventional aspects of Lustre file systems may be found in, for example, Parallel File Systems, Inc., "Lustre: A Scalable, High-Performance File System," November 2002, pp. 1-13, and F. Wang et al., "Understanding Lustre Filesystem Internals," Tech Report ORNL/TM-2009/117, April 2010, pp. 1-95, which are incorporated by reference herein.

Storage arrays utilized in the parallel file system may comprise, for example, storage products such as VNX and Symmetrix VMAX, both commercially available from EMC Corporation of Hopkinton, Mass. A variety of other storage products may be utilized to implement at least a portion of the object storage targets and metadata target of the parallel file system.

In a message logging implementation of the asynchronous checkpointing, message logging can be implemented in one or more burst buffer appliances in a manner that avoids the need for any significant changes to clients, compute nodes or the parallel file system or applications running on those devices. For example, burst buffer appliances can communicate with the compute nodes and parallel file system to perform message logging in conjunction with asynchronous checkpointing. The burst buffer appliance optionally comprises one or more controllers (not shown) to perform message logging in conjunction with asynchronous checkpointing and numerous alternative controllers having various configurations that may be used in a given burst buffer appliance in other embodiments.

Figure 3:
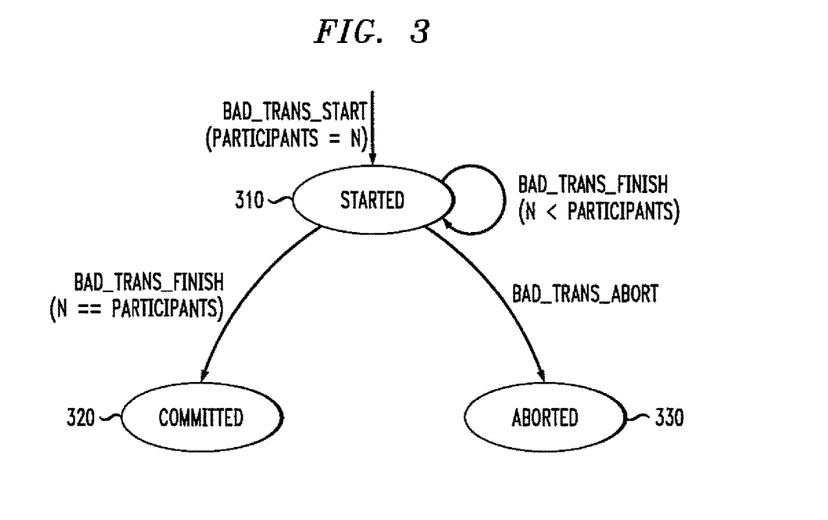
FIG. 3 illustrates exemplary transactional states of an exemplary asynchronous modification mode.

FIG. 3 illustrates exemplary transactional states 310, 320, 330 of an asynchronous modification mode. The state-transition diagram of FIG. 3 shows the valid states of asynchronous checkpoint transactions. It is noted that an exemplary asynchronous modification mode uses reference counting to provide data consistency via an atomic commit of a distributed set of asynchronous modifications.

As noted above, exemplary transaction-based asynchronous checkpoint systems employ coordination within the distributed storage system to ensure a consistent checkpoint data set. In particular, each participant in a transaction establishes with its peers a version identifier for each transaction, and also agrees on the number of peers participating in the transaction. With this knowledge, instead of simply writing to a shared file or directory, each participant writes to a shared data set within a shared transaction. The storage system does reference counting on the participants and is responsible for the atomic commit of the asynchronous distributed modifications upon transaction completion.

Figure 4:
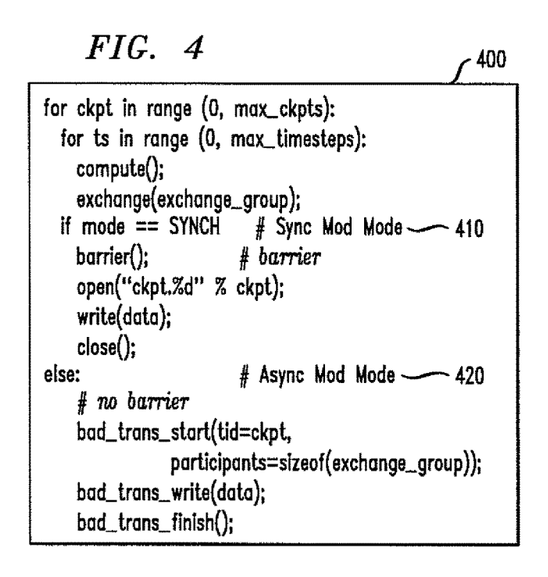
FIG. 4 illustrates exemplary pseudo code for comparing a distributed application in a synchronous modification mode and an asynchronous modification mode.

FIG. 4 illustrates exemplary pseudo code 400 for comparing a distributed application in a synchronous modification mode and an asynchronous modification mode. FIG. 4 shows the presence of the barrier call in the branch 410 for the synchronous modification mode and shows the absence of the barrier call in the branch 420 for the asynchronous modification mode. The opening and closing of asynchronous modification mode objects have been omitted from FIG. 4 for ease of illustration, which could be done within, or outside of, the main for loop.

FIG. 5 illustrates an exemplary set of simulation parameters 500 that may be employed to configure the simulator 200 for the particular distributed application under consideration. Generally, the simulation parameters 500 list workload characteristics that affect an ability of a workload to benefit from the asynchronous modification mode. FIG. 5 also indicates exemplary default values used in a particular simulation study of a particular distributed application. It is noted that the default behavior causes the application to spend approximately ten percent of its runtime doing checkpoints as is typical of large parallel applications.

The exemplary simulation parameters 500 comprise a compute time value indicating the simulated amount of compute time within each timestep and having a default value of 6 seconds.

A compute variance value indicates the maximum randomized difference between compute timesteps and has a default value of 16.7%. A timesteps per checkpoint value indicates the simulated number of timesteps between checkpoints and has a default value of 45.

A checkpoint time indicates the simulated checkpoint latency and has a default value of 30 seconds. A checkpoint variance value indicates the maximum randomized difference between checkpoints and has a default value of 0%. A runtime value indicates the total simulated runtime and has a default value of 300 checkpoints.

A job size value indicates the number of processes in the simulated two-dimensional (2D) compute grid and has a default value of $1024^2$. A hotspot movement value indicates the speed of hotspot movement within the 2D compute grid and has a default value of 1:1. A communication size value indicates the size of peer groups exchanging data between timesteps and has a default value of neighbors (i.e., communications only among neighbors).

As discussed further below in conjunction with FIG. 8, an exemplary simulated process computes on a region of a two-dimensional virtual grid (e.g., representing a wildfire burning through a forest). Initially, each process's time is spent in a calculation phase, referred to as a timestep. Each process's simulated time in each timestep value is calculate by randomly adjusting the Compute Time value with a variance between +/−Compute Variance (i.e., between 5 to 7 seconds). Following the calculation, the processes immediately enter a message passing phase with a configurable number of neighbors, Comm Size. This messaging synchronizes all processes within a communication group.

The simulated processes repeat this cycle Timesteps Per Checkpoint times and then simulate the time required to create a checkpoint. In the synchronous modification mode simulation, the processes barrier before each checkpoint. The checkpoint time is Checkpoint Time without any variance (we explain the reasoning behind this decision later). The complete workload finishes after Runtime checkpoints. The initially randomly assigned Compute Time values are periodically shifted by some number of cells every some number of timesteps; this simulates the movement of hot spots throughout the computational grid.

FIGS. 6(*a*) through 6(*e*) illustrates the variation of values of a particular parameter 500 of FIG. 5 to evaluate the performance of the distributed application in various asynchronous modification modes. Generally, parameter sweeps of each of these application characteristics, permit the types of workloads that can benefit from an asynchronous modification mode to be quantified, as well as quantifying the degree to which they can do so.

Generally, for FIGS. 6(*a*)-6(*e*), the y-axis shows the normalized total runtime of an asynchronous modification mode relative to a synchronous modification mode (lower is better). For all experiments, the values for all variables with the exclusion of the particular independent variable were set to their default values as shown in FIG. 5.

FIG. 6(*a*) illustrates the compute variation parameter of FIG. 5 for a particular application. As shown in FIG. 6(*a*), for a particular application with little compute variation (e.g., all processors essentially do the same work and doesn't matter if they have to wait), there is little benefit for converting to an asynchronous modification mode. For a particular application with large compute variation, there is a significant benefit to converting to an asynchronous modification mode. Thus, FIG. 6(*a*) studies the effect of computational variance between the cooperative processes and shows that an asynchronous modification mode is only beneficial when there is variance across the processes. This is intuitive because processes that proceed at the same rate will arrive at the checkpoint phase simultaneously and thus prevent any asynchrony from entering the system. It can be shown that for checkpoint variance, the performance gains possible with an asynchronous modification mode are further improved.

FIG. 6(*b*) illustrates the communication size parameter of FIG. 5 for a particular application. For some applications, the processing nodes in the distributed workspace only communicate with immediate neighbors (for example, in a 3×3 node grid), while the processing nodes for other applications might perform global communications among the various processing nodes. FIG. 6(*b*) similarly shows that an asynchronous modification mode relies on the cooperative processes becoming skewed. In FIG. 6(b), the x-axis is the number of siblings with whom messages are exchanged during the compute phase. Since message passing is synchronous and blocking for most message passing interfaces, when the application does global message passing, all processes effectively proceed through the computation at the same rate and arrive simultaneously at each checkpoint. Conversely, local message passing in which data is only passed to immediate neighbors, as is done in many applications, allows the skew integral to an asynchronous modification mode to build within the system.

Figure 6A:
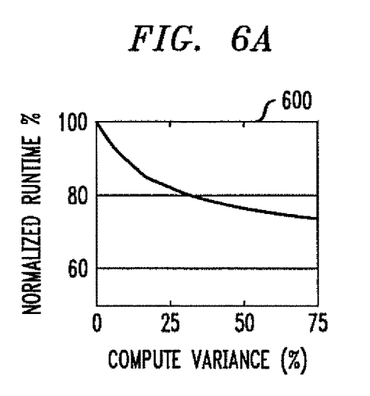
FIGS. 6(a) through 6(e) illustrate various simulation parameters of FIG. 5 for a particular application.
Figure 6B:
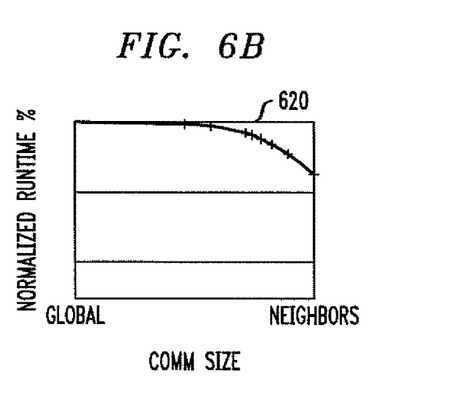
Figure 6C:
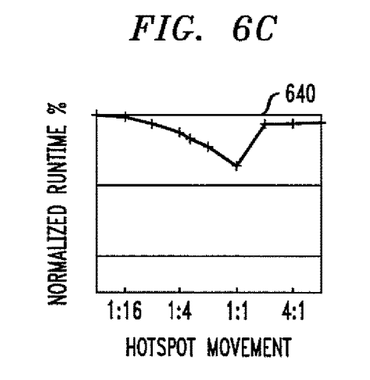

FIG. 6(c) illustrates the hotspot movement parameter of FIG. 5 for a particular application. Some processors in the distributed compute nodes will do more work than others at a given time, referred to as a hotspot. For example, a hotspot occurs when there is more data to be processed in a given segment of the distributed workspace. With conventional synchronous modification techniques, all processes must wait for the slowest process. For an asynchronous modification mode to be beneficial, hot spots are needed that move around the distributed workspace.

FIG. 6(c) graphs the importance of skew. In FIG. 6(c), the x-axis is the speed with which hotspots move throughout the computation. Maximum benefit from an asynchronous modification mode is possible when hotspots move neither too slowly nor too quickly relative to the checkpoint frequency. When hotspots move too slowly (as on the left-side of FIG. 6(c)), then total runtime cannot be improved since the processes which start slow never become fast and will never converge with their faster siblings. Conversely, hotspots which move too quickly also reduce skew: when every process is both slow and fast within the same compute phase, they effectively arrive simultaneously at the compute phase. It has been found that hotspots that moved at the rate of the checkpoints maximized runtime improvements.

Figure 6D:
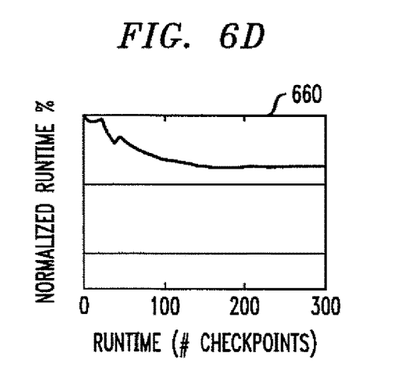
Figure 6E:
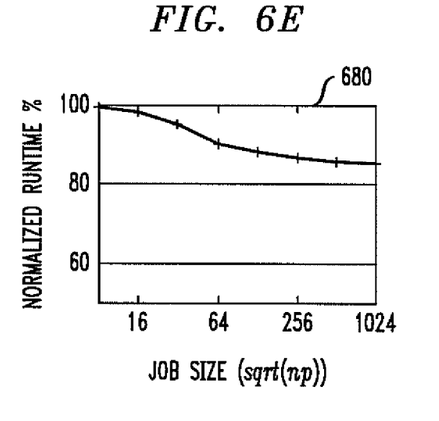

FIG. 6(d) and FIG. 6(e) illustrate the runtime and job size parameters of FIG. 5, respectively, for a particular application. FIGS. 6(d) and 6(e) show the scalability of an asynchronous modification mode as a function of both runtime and job size respectively. Larger jobs benefit more as there will be more skew and longer running jobs benefit more than shorter running jobs until they flatten at the maximum benefit which is related to the average skew across processes.

Figure 7:
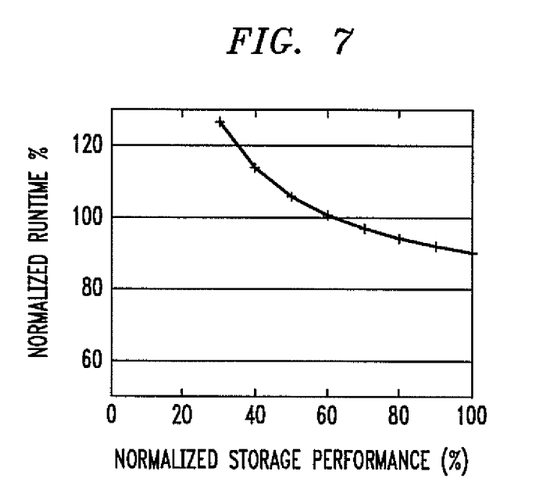
FIG. 7 illustrates performance and required capabilities of the storage system of a particular distributed application in an asynchronous modification mode.

FIG. 7 illustrates how an asynchronous modification mode can be used to improve performance and/or to reduce the capabilities of the storage system without reducing performance. Generally, FIG. 7 shows that a storage system for a given distributed application in an asynchronous modification mode can be reduced by a particular percentage, with the same job throughput, relative to the given distributed application in a synchronous modification mode. In this manner, FIG. 7 can be employed to assess a reduction of the capability of the storage system (thereby reducing the total cost of ownership of the storage) without sacrificing performance. As before, the y-axis is the normalized runtime; and the x-axis is the normalized capability of the storage system. For one exemplary set of default simulator parameters for an asynchronous modification mode, the capability of the storage system can be reduced by 40% without sacrificing performance.

Figure 8B:
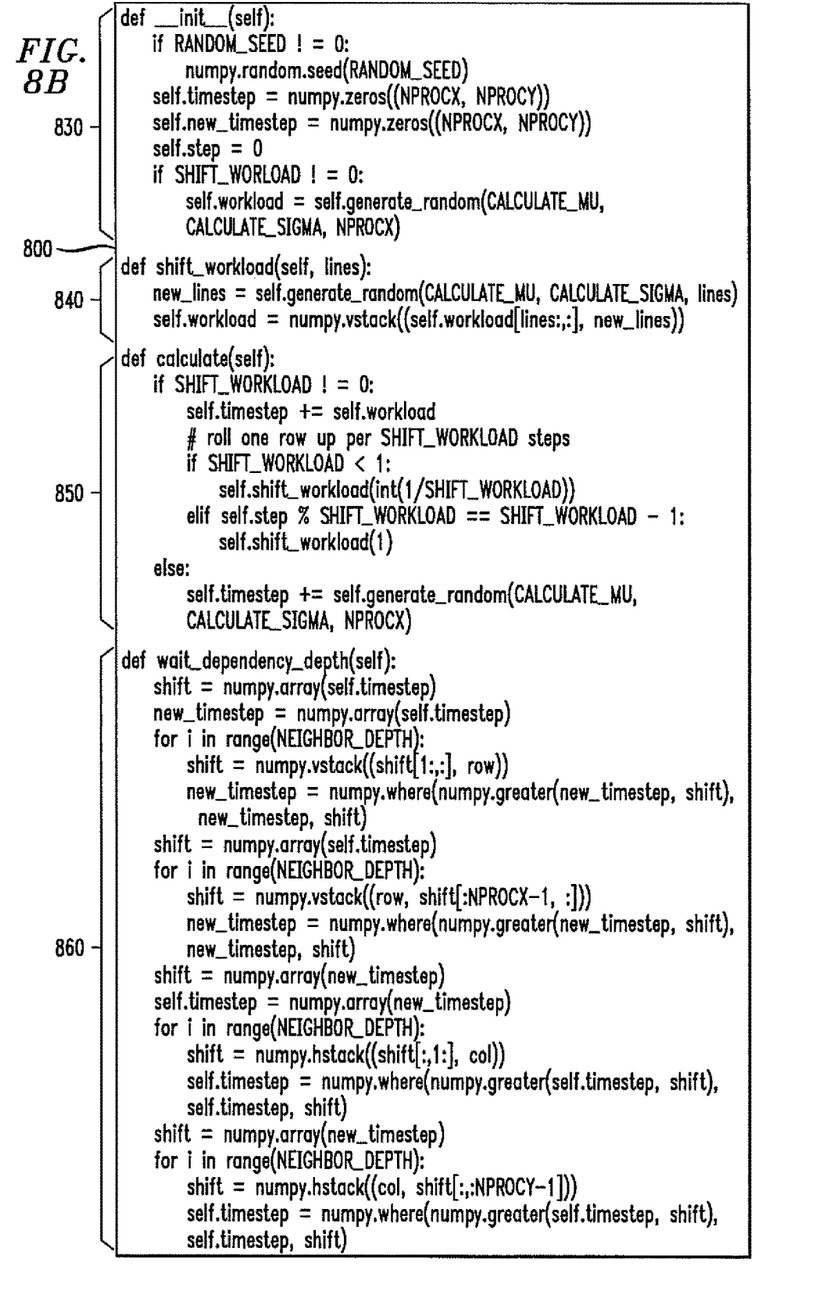
Figure 8C:
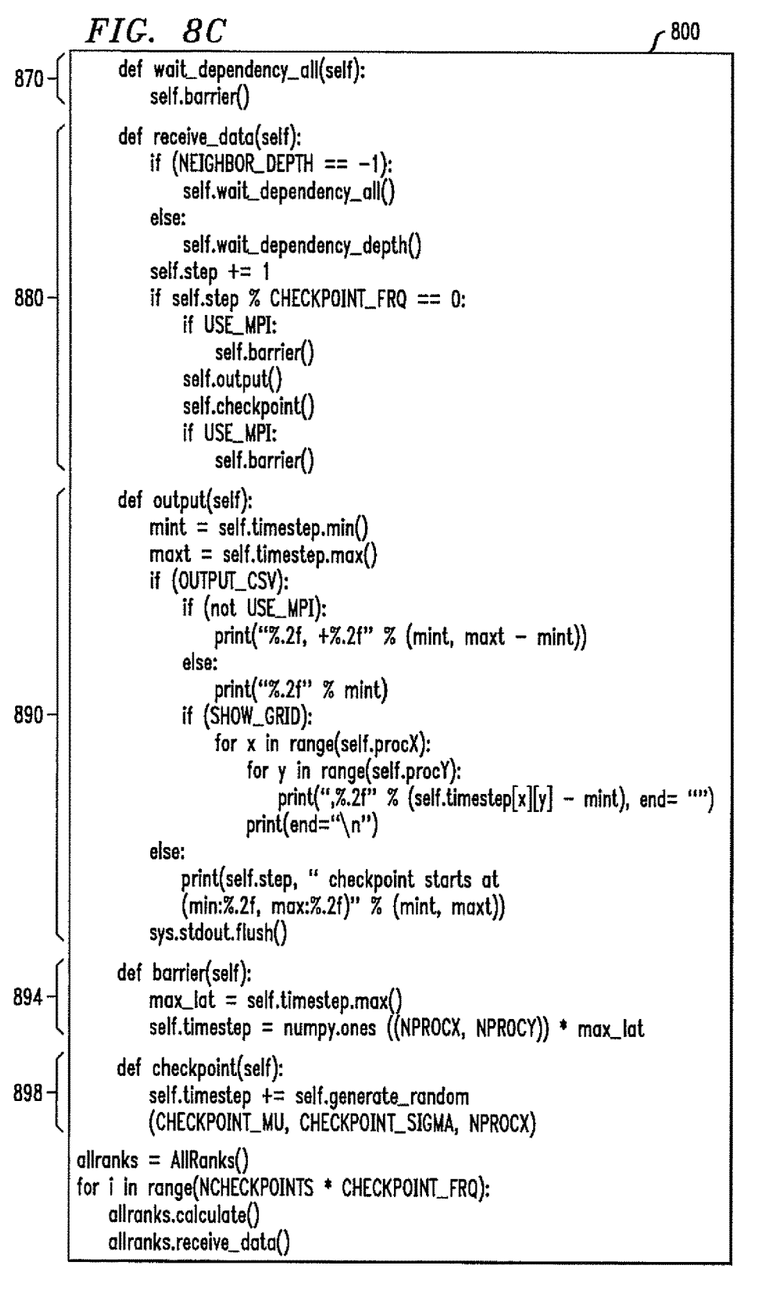

FIGS. 8A through 8C, collectively, illustrate exemplary pseudo code 800 for a performance comparison simulator in accordance with an embodiment of the invention. As shown in FIG. 8A, the exemplary pseudo code 800 comprises a code section 810 that defines the input parameters discussed above in conjunction with FIG. 5. In the exemplary implementation of FIG. 8A, the USE_MPI value is used to differentiate between a synchronous data modification mode (MPI) and an asynchronous modification mode (IOD). The CALCULATE_SIGMA value corresponds to the compute variance parameter in FIG. 5. The SHIFT_WORKLOAD value corresponds to the hotspot movement parameter in FIG. 5. The NEIGHBOR_DEPTH value corresponds to the communication size parameter in FIG. 5. The product of the NPROCX and NPROCY values corresponds to the job size parameter in FIG. 5. The CALCULATE_MU value corresponds to the compute time parameter in FIG. 5. The CHECKPOINT_MU value corresponds to the checkpoint time parameter in FIG. 5. The CHECKPOINT_SIGMA value corresponds to the checkpoint variance parameter in FIG. 5. The CHECKPOINT_FRQ value corresponds to the timesteps-per-checkpoint parameter in FIG. 5.

It is noted that Numpy is a package or library for scientific computing with the exemplary Python simulator 200.

In addition, code section 820 defines a generate_random function that sets up the initial computing. Generally, if there is no compute variation, the generate_random function returns NPROCY (the number of nodes per row). Otherwise, the generate_random function normalizes by the compute variation, sigma.

As shown in FIG. 8B, code section 830 simulates every processor and each processor is assigned a random amount of work (i.e., compute time). In code section 840, the assigned compute times are swapped among processors based on the SHIFT_WORKLOAD value. Code section 850 tracks how long the processors have been running and performs work for the self.timestep value and then performs a message exchange. Code section 860 defines a wait_dependency_depth function that includes code to synchronize write operations with the slowest member of the NEIGHBOR_DEPTH group. Generally, after performing the work, a process waits for its neighbors (unless the processor is the slowest processor).

As shown in FIG. 8C, code section 870 defines a wait_dependency_all function that calls a barrier function. Code section 880 calls the wait_dependency_all function for global communications (depth=-1), otherwise calls the wait_dependency_depth function (to wait for the slowest member of the group). The step command advances the time to the next timestep. If it is time to perform a checkpoint, based on the defined CHECKPOINT_FRQ value, two barriers are called (before and after the checkpoint) if the USE_MPI value indicates a synchronous data modification mode. Otherwise, barriers are not called if the USE_MPI value indicates an asynchronous data modification mode. The clock is adjusted by the checkpoint time. Code section 890 returns information about the result. Code section 894 defines a barrier function that sets the wait time based on a timestep. Code section 898 defines the checkpoint function that calculates the timestep and receives data for every timestep. In addition, the checkpoint is performed, if needed (e.g., every 3 timesteps).

CONCLUSION

It is to be appreciated that the particular operations and associated messaging illustrated in FIGS. 8A through 8C are exemplary only, and numerous other types of operations and messaging may be used in other embodiments.

It should therefore be understood that in other embodiments different arrangements of additional or alternative elements may be used. At least a subset of these elements may be collectively implemented on a common processing platform or each such element may be implemented on a separate processing platform.

Also, numerous other arrangements of computers, servers, storage devices or other components are possible in the simulated parallel computing system. Such components can communicate with other elements of the parallel computing system over any type of network or other communication media.

As indicated previously, components of a simulator 200 as disclosed herein can be implemented at least in part in the form of one or more software programs stored in memory and executed by a processor of a processing device. A memory having such program code embodied therein is an example of what is more generally referred to herein as a "computer program product."

The simulator 200 or portions thereof may be implemented using one or more processing platforms each comprising a plurality of processing devices. Each such processing device may comprise a processor, a memory and network interface components of the type described above in conjunction with FIG. 2.

As indicated above, simulation of an asynchronous modification mode such as that described in conjunction with FIGS. 2 and 8 can be implemented at least in part in the form of one or more software programs stored in memory and executed by a processor of a processing device such as a computer or server. A memory or other storage device having such program code embodied therein is an example of what is more generally referred to herein as a "computer program product." Certain system components are implemented using a combination of software and hardware.

It should again be emphasized that the above-described embodiments of the invention are presented for purposes of illustration only. Many variations and other alternative embodiments may be used. For example, the disclosed simulation techniques are applicable to a wide variety of other types and arrangements of parallel computing systems and associated clients, servers and other processing and storage devices that can benefit from the simulator functionality as described herein. Also, the particular configurations of system and device elements shown in FIG. 2 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
    obtaining a plurality of simulation parameters that define parameters of a simulated distributed application, parameters of a plurality of distributed compute nodes on which the simulated distributed application executes and a storage system employed by the simulated distributed application;
    applying, using at least one processing device, said plurality of simulation parameters to a simulation engine, wherein said simulation engine simulates both synchronous and asynchronous modifications of at least one shared data object by a plurality of distributed processes within said simulated distributed application, wherein said asynchronous modifications of said at least one shared data object by said plurality of distributed processes employ a transaction-based approach where said asynchronous modifications of said at least one shared data object are committed after said plurality of distributed processes have made said asynchronous modifications based on a reference counting of the plurality of distributed processes; and
    evaluating whether said simulated distributed application will exhibit a performance improvement using said asynchronous modifications by said plurality of distributed processes, relative to said synchronous modifications by said plurality of distributed processes, based on one or more outputs from said simulation engine, wherein said performance improvement comprises one or more of a decreased execution time, a decreased requirement for compute resources, and a decreased requirement for storage resources.

2. The method of claim 1, wherein said simulation engine selectively enables one or more barrier operations associated with synchronous modifications of said at least one shared data object by said plurality of distributed processes.

3. The method of claim 1, wherein said simulation engine selectively disables one or more barrier operations associated with said asynchronous modifications of said at least one shared data object by said plurality of distributed processes.

4. The method of claim 1, further comprising the step of assessing a throughput performance of said simulated distributed application in an asynchronous modification mode that performs said asynchronous modifications of said at least one shared data object.

5. The method of claim 1, further comprising the step of varying a compute variation parameter value of the simulated distributed application for a plurality of successive distributed state capture operations by the simulated distributed application.

6. The method of claim 1, further comprising the step of varying a communication size parameter value of the simulated distributed application for a plurality of successive distributed state capture operations by the simulated distributed application.

7. The method of claim 1, further comprising the step of varying a hotspot movement parameter value of the simulated distributed application for a plurality of successive distributed state capture operations by the simulated distributed application.

8. The method of claim 1, further comprising the step of varying a runtime parameter value of the simulated distributed application for a plurality of successive distributed state capture operations by the simulated distributed application.

9. The method of claim 1, further comprising the step of varying a job size parameter value of the simulated distributed application for a plurality of successive distributed state capture operations by the simulated distributed application.

10. The method of claim 1, further comprising the step of evaluating required capabilities of the storage system in said asynchronous modification mode to achieve a substantially same performance as said simulated distributed process in a synchronous modification mode.

11. A system, comprising:
    a memory; and
    at least one processing device configured to:
    obtain a plurality of simulation parameters that define parameters of a simulated distributed application, parameters of a plurality of distributed compute nodes on which the simulated distributed application executes and a storage system employed by the simulated distributed application;
    apply, using at least one processing device, said plurality of simulation parameters to a simulation engine, wherein said simulation engine simulates both synchronous and asynchronous modifications of at least one shared data object by a plurality of distributed processes within said simulated distributed application, wherein said asynchronous modifications of said at least one shared data object by said plurality of distributed processes employ a transaction-based approach where said asynchronous modifications of said at least one shared data object are committed after said plurality of distributed processes have made said asynchronous modifications based on a reference counting of the plurality of distributed processes; and evaluate whether said simulated distributed application will exhibit a performance improvement using said asynchronous modifications by said plurality of distributed processes, relative to said synchronous modifications by said plurality of distributed processes, based on one or more outputs from said simulation engine, wherein said performance improvement comprises one or more of a decreased execution time, a decreased requirement for compute resources, and a decreased requirement for storage resources.

12. The system of claim 11, wherein said simulation engine selectively enables one or more barrier operations associated with synchronous modifications of said at least one shared data object by said plurality of distributed processes.

13. The system of claim 11, wherein said simulation engine selectively disables one or more barrier operations associated with said asynchronous modifications of said at least one shared data object by said plurality of distributed processes.

14. The system of claim 11, wherein said at least one processing device is further configured to assess a throughput performance of said simulated distributed application in an asynchronous modification mode that performs said asynchronous modifications of said at least one shared data object.

15. The system of claim 11, further comprising the step of varying a parameter value of the simulated distributed application for a plurality of successive distributed state capture operations by the simulated distributed application.

16. The system of claim 11, wherein said at least one processing device is further configured to evaluate required capabilities of the storage system in said asynchronous modification mode to achieve a substantially same performance as said simulated distributed process in a synchronous modification mode.

17. A non-transitory machine-readable recordable storage medium, wherein one or more software programs when executed by one or more processing devices implement the following steps:

obtaining a plurality of simulation parameters that define parameters of a simulated distributed application, parameters of a plurality of distributed compute nodes on which the simulated distributed application executes and a storage system employed by the simulated distributed application;

applying, using at least one processing device, said plurality of simulation parameters to a simulation engine, wherein said simulation engine simulates both synchronous and asynchronous modifications of at least one shared data object by a plurality of distributed processes within said simulated distributed application, wherein said asynchronous modifications of said at least one shared data object by said plurality of distributed processes employ a transaction-based approach where said asynchronous modifications of said at least one shared data object are committed after said plurality of distributed processes have made said asynchronous modifications based on a reference counting of the plurality of distributed processes; and evaluating whether said simulated distributed application will exhibit a performance improvement using said asynchronous modifications by said plurality of distributed processes, relative to said synchronous modifications by said plurality of distributed processes, based on one or more outputs from said simulation engine, wherein said performance improvement comprises one or more of a decreased execution time, a decreased requirement for compute resources, and a decreased requirement for storage resources.

18. The storage medium of claim 17, wherein said simulation engine selectively enables one or more barrier operations associated with synchronous modifications of said at least one shared data object by said plurality of distributed processes.

19. The storage medium of claim 17, wherein said simulation engine selectively disables one or more barrier operations associated with said asynchronous modifications of said at least one shared data object by said plurality of distributed processes.

20. The storage medium of claim 17, further comprising the step of assessing a throughput performance of said simulated distributed application in an asynchronous modification mode that performs said asynchronous modifications of said at least one shared data object.

* * * * *